United States Patent
Wu

(10) Patent No.: US 9,980,316 B2
(45) Date of Patent: May 22, 2018

(54) DEVICE AND METHOD OF HANDLING AUTHENTICATION PROCEDURE

(71) Applicant: HTC Corporation, Taoyuan (TW)

(72) Inventor: Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 68 days.

(21) Appl. No.: 15/209,768

(22) Filed: Jul. 14, 2016

(65) Prior Publication Data

US 2017/0019947 A1    Jan. 19, 2017

Related U.S. Application Data

(60) Provisional application No. 62/192,078, filed on Jul. 14, 2015.

(51) Int. Cl.

| H04W 76/27 | (2018.01) |
|---|---|
| H04W 12/06 | (2009.01) |
| H04L 29/12 | (2006.01) |
| H04W 76/04 | (2009.01) |
| H04L 29/06 | (2006.01) |
| H04W 12/04 | (2009.01) |
| H04W 84/12 | (2009.01) |

(Continued)

(52) U.S. Cl.
CPC ......... *H04W 76/27* (2018.02); *H04L 61/6022* (2013.01); *H04L 61/6081* (2013.01); *H04L 63/205* (2013.01); *H04W 12/06* (2013.01); *H04W 76/046* (2013.01); H04L 63/162 (2013.01); H04L 63/18 (2013.01); H04W 12/04 (2013.01); H04W 84/042 (2013.01); H04W 84/12 (2013.01); H04W 88/06 (2013.01)

(58) Field of Classification Search
None
See application file for complete search history.

(56) References Cited

U.S. PATENT DOCUMENTS 9,526,027 B2 * 12/2016 Gupta ............... H04N 21/2365
9,603,192 B2 *  3/2017 Mohebbi ............... H04W 92/02
9,615,388 B2 *  4/2017 Jeong ..................... H04W 8/26

(Continued)

OTHER PUBLICATIONS

Search Report dated Nov. 18, 2016 for EP application No. 16179453.2, pp. 1~14.

(Continued)

*Primary Examiner* — Hong Cho
(74) *Attorney, Agent, or Firm* — Winston Hsu

(57) ABSTRACT

A network comprising a cellular network and a WLAN for handling an authentication procedure with a communication device comprises a storage unit for storing instructions and a processing means coupled to the storage unit. The processing means is configured to execute the instructions stored in the storage unit. The instructions comprise performing a first connection to the communication device by the cellular network; performing a second connection to the communication device by the WLAN; initiating an EAP AKA procedure to the communication device by the WLAN, if the communication device is not configured with a communication of cellular PDUs via the WLAN; and initiating an eNB assisted authentication procedure to the communication device by the cellular network, if the communication device is configured with the communication of the cellular PDUs via the WLAN.

15 Claims, 4 Drawing Sheets

(51) Int. Cl.
*H04W 84/04* (2009.01)
*H04W 88/06* (2009.01)

(56) References Cited

U.S. PATENT DOCUMENTS

| | | | |
|---|---|---|---|
| 2014/0181904 A1 | 6/2014 | Craig | |
| 2015/0003435 A1* | 1/2015 | Horn | H04L 5/0058 370/338 |
| 2015/0173000 A1* | 6/2015 | Basilier | H04W 48/18 370/329 |
| 2015/0327129 A1* | 11/2015 | Faccin | H04W 36/0055 370/331 |
| 2015/0341845 A1* | 11/2015 | Hedberg | H04W 12/08 370/329 |
| 2016/0149916 A1* | 5/2016 | Lindheimer | H04L 63/162 726/4 |
| 2016/0338133 A1* | 11/2016 | Lee | H04W 76/025 |

OTHER PUBLICATIONS

Huawei, HiSilicon, "Authentication and encryption between UE and WLAN for aggregation", 3GPP TSG-RAN WG2 Meeting #90, R2-152655, May 25-29, 2015, Fukuoka, Japan, XP050972898, pp. 1-3.

Huawei, HiSilicon, "User plane architecture and associated key aspects for 3GPP/WLAN aggregation", 3GPP TSG-RAN2 Meeting #89bis, R2-151569, Apr. 20-24, 2015, Bratislava, Slovakia, XP050936484, pp. 1-4.

3GPP TS 33.234 V12.1.0 (Sep. 2014), "3rd Generation Partnership Project; Technical Specification Group Services and System Aspects; 3G Security; Wireless Local Area Network (WLAN) interworking security (Release 12)", XP050907387, pp. 1-97.

3GPP TS 36.331 V12.5.0 (Mar. 2015), "3rd Generation Partnership Project; Technical Specification Group Radio Access Network; Evolved Universal Terrestrial Radio Access (E-UTRA); Radio Resource Control (RRC); Protocol specification (Release 12)", XP050928130, pp. 1-445.

3GPP TS 36.300 V12.5.0 (Mar. 2015).
3GPP TS 36.321 V12.5.0 (Mar. 2015).
3GPP TS 36.331 V12.5.0 (Mar. 2015).
3GPP TS 36.323 V12.3.0 (Mar. 2015).
3GPP TS 33.234 V12.1.0 (Sep. 2014).
R2-152655, 3GPP TSG-RAN WG2 Meeting #90 Fukuoka, Japan, May 25-29, 2015.
R2-152125, 3GPP TSG RAN WG2 Meeting #90 Fukuoka, Japan, May 25-29, 2015.
R2-152126, 3GPP TSG RAN WG2 Meeting #90 Fukuoka, Japan, May 25-29, 2015.

* cited by examiner

DEVICE AND METHOD OF HANDLING AUTHENTICATION PROCEDURE

CROSS REFERENCE TO RELATED APPLICATIONS

This application claims the benefit of U.S. Provisional Application No. 62/192,078, filed on Jul. 14, 2015, which is incorporated herein by reference.

BACKGROUND OF THE INVENTION

1. Field of the Invention

The present invention relates to a communication device and a method used in a wireless communication system, and more particularly, to a communication device and a method of handling authentication procedure in a wireless communication system.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with user equipments (UEs), and for communicating with a core network including a mobility management entity (MME), a serving gateway, etc., for Non-Access Stratum (NAS) control.

A wireless local area network (WLAN) performs a first authentication procedure to the UE, when the UE connects to the WLAN. On the other hand, the eNB performs a second authentication procedure to the UE, when the UE connects to the WLAN and the eNB. According to 3rd Generation Partnership Project (3GPP) standard, it is not known how a network including the WLAN and the E-UTRAN determines to perform the first authentication procedure or the second authentication procedure to the UE, when the network supports both the first authentication procedure and the second authentication procedure and the UE connects to the network.

Thus, how to handle an authentication procedure performed by the network to the UE is an important problem to be solved.

SUMMARY OF THE INVENTION

The present invention therefore provides a communication device and a method for handling authentication procedure to solve the abovementioned problem.

A network comprising a cellular network and a wireless local area network (WLAN) for handling an authentication procedure with a communication device comprises a storage unit for storing instructions and a processing means coupled to the storage unit. The processing means is configured to execute the instructions stored in the storage unit. The instructions comprise performing a first connection to the communication device by the cellular network; performing a second connection to the communication device by the WLAN; initiating an extensible authentication protocol (EAP) authentication and key agreement (AKA) procedure to the communication device by the WLAN, if the communication device is not configured with a communication of cellular protocol data units (PDUs) via the WLAN; and initiating an evolved Node-B (eNB) assisted authentication procedure to the communication device by the cellular network, if the communication device is configured with the communication of the cellular PDUs via the WLAN.

A communication device for handling an authentication procedure with a network comprising a cellular network and a WLAN comprises a storage unit for storing instructions and a processing means coupled to the storage unit. The processing means is configured to execute the instructions stored in the storage unit. The instructions comprise performing a first connection to an eNB of the cellular network; performing a second connection to the WLAN; performing an EAP AKA procedure with the WLAN, if the communication device is not configured with a communication of cellular PDUs via the WLAN; and performing an eNB assisted authentication procedure with the eNB, if the communication device is configured with the communication of the cellular PDUs via the WLAN.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
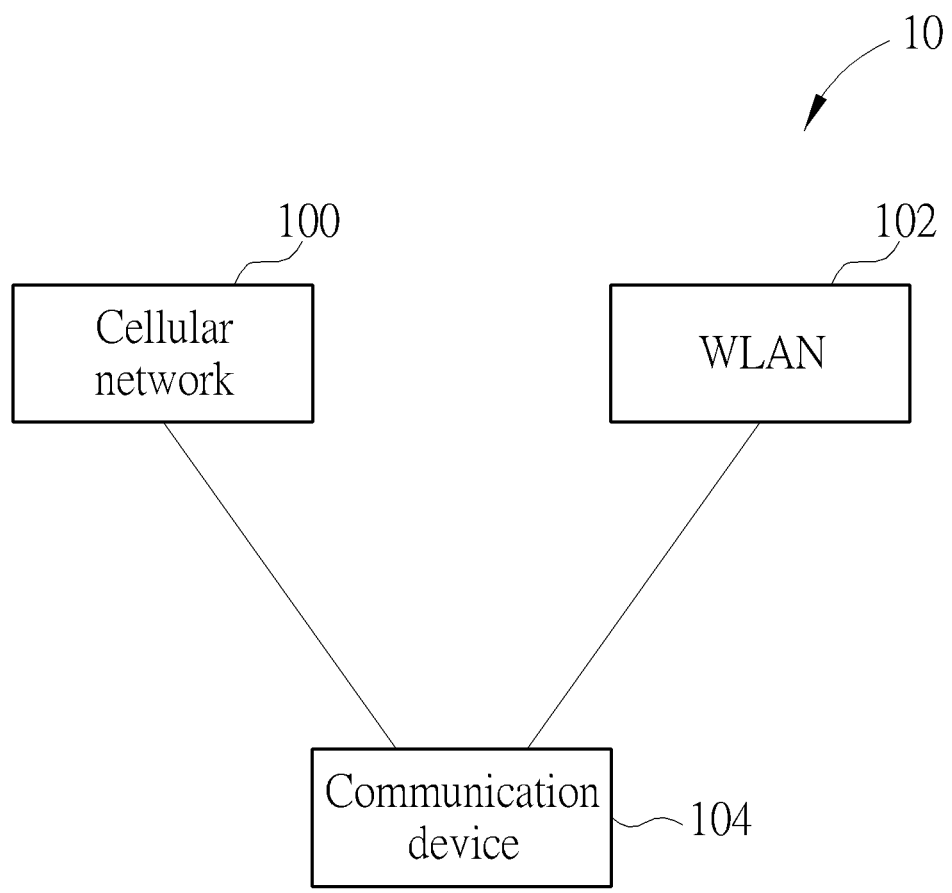
FIG. 1 is a schematic diagram of a wireless communication system according to an example of the present invention.

FIG. 1 is a schematic diagram of a wireless communication system 10 according to an example of the present invention. The wireless communication system 10 is briefly composed of a cellular network 100, a wireless local area network (WLAN) 102 and a communication device 104. Practically, the cellular network 100 may be an evolved UTRAN (E-UTRAN) comprising at least one evolved NB (eNB) and/or at least one relay. In another example, the cellular network 100 may be a fifth generation (5G) network including at least one 5G eNB which employs orthogonal frequency-division multiplexing (OFDM) and/or non-OFDM, and a transmission time interval (TTI) for communicating with the communication devices is smaller than 1 millisecond (ms). In general, a base station (BS) is used to refer any of the eNB and the 5G eNB. In one example, a WiFi standard operated by the WLAN may include IEEE 802.11ac, IEEE 802.11n, IEEE 802.11g, IEEE 802.11b and IEEE 802.11a operated in 2.4 GHz or 5 GHz band.

The communication device 104 can be a user equipment (UE), a mobile phone, a laptop, a tablet computer, an electronic book, a portable computer system, a vehicle or aircraft. In addition, the cellular network 100 and the communication device 104 can be seen as a transmitter or a receiver according to direction (i.e., transmission direction), e.g., for an uplink (UL), the communication device 104 is the transmitter and the cellular network 100 (or the WLAN 102) is the receiver, and for a downlink (DL), the cellular network 100 (or the WLAN 102) is the transmitter and the communication device 104 is the receiver.

Figure 2:
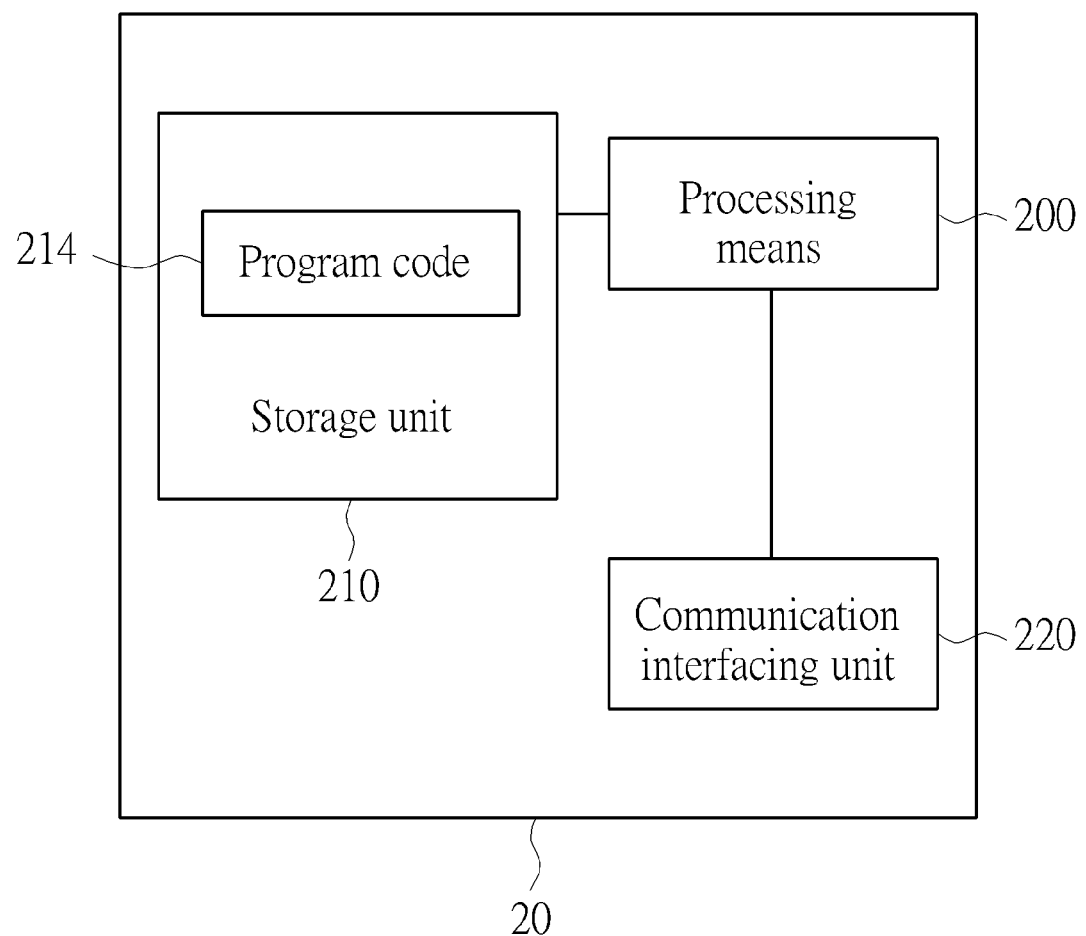
FIG. 2 is a schematic diagram of a communication device according to an example of the present invention.

FIG. 2 is a schematic diagram of a communication device 20 according to an example of the present invention. The communication device 20 may be the communication device 104, the cellular network 100 or the WLAN 102 shown in FIG. 1, but is not limited herein. The communication device 20 may include a processing means 200 including at least one processor or Application Specific Integrated Circuit (ASIC), at least one storage unit 210 and a communication interfacing unit 220. The at least one storage unit 210 may be any data storage device that may store a program code 214, accessed and executed by the processing means 200. Examples of the at least one storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 includes at least one transceiver and is used to transmit and receive signals (e.g., data, signals, messages and/or packets) according to processing results of the processing means 200. For example, the at least one processor may include first and second processors, and the at least one transceiver may include first and second transceivers. The first transceiver is used to transmit or receive signals to or from the cellular network 100 according to processing results of the first processor, and the second transceiver is used to transmit or receive signals to or from the WLAN 102 according to processing results of the second processor. The at least one storage unit 210 may include first and second storage units. The first storage unit stores a first program code, accessed and executed by the first processor. The second storage unit stores a second program code, accessed and executed by the second processor.

For simplicity, the UE is used to represent the communication device 104 in FIG. 1 in the following examples.

Figure 3:
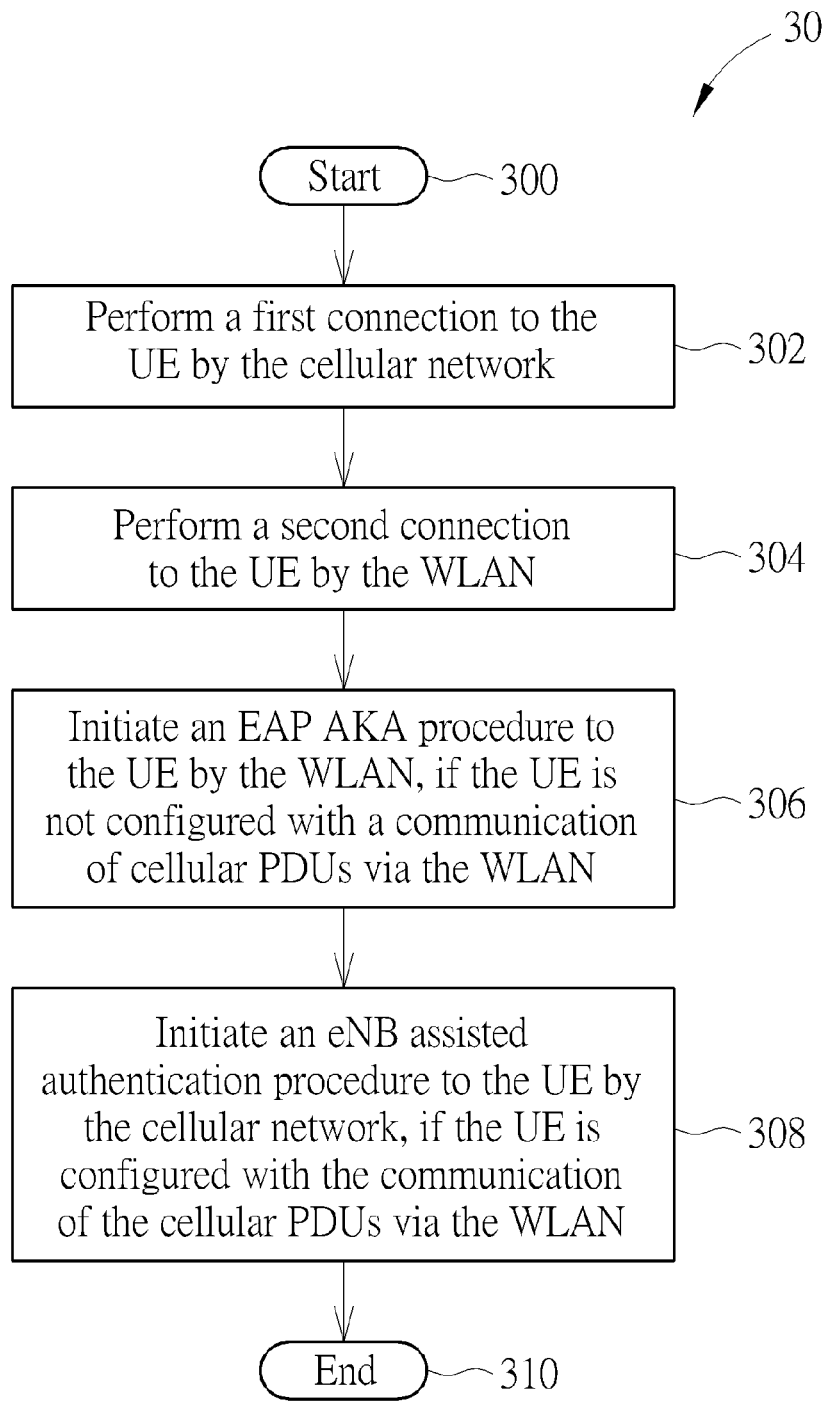
FIG. 3 is a flowchart of a process according to an example of the present invention.

FIG. 3 is a flowchart of process 30 according to an example of the present invention. The process 30 may be utilized in a network including a cellular network (e.g., the cellular network 100 of FIG. 1) and a WLAN (e.g., the WLAN 102 of FIG. 1), to handle an authentication procedure. The process 30 may be compiled into the program code 214, and includes the following steps:

Step 300: Start.

Step 302: Perform a first connection to the UE by the cellular network.

Step 304: Perform a second connection to the UE by the WLAN.

Step 306: Initiate an extensible authentication protocol (EAP) authentication and key agreement (AKA) procedure to the UE by the WLAN, if the UE is not configured with a communication of cellular protocol data units (PDUs) via the WLAN.

Step 308: Initiate an eNB assisted authentication procedure to the UE by the cellular network, if the UE is configured with the communication of the cellular PDUs via the WLAN.

Step 310: End.

According to the process 30, the network may perform a first connection to the UE by the cellular network. The network may perform a second connection to the UE by the WLAN. Then, the network may initiate an EAP AKA procedure to the UE by the WLAN, if the UE is not configured with a communication (e.g., a transmission and/or a reception) of cellular PDUs via the WLAN (e.g., according to the long-term evolution (LTE) and WLAN aggregation). The network may initiate an eNB assisted authentication procedure to the UE by the cellular network, if the UE is configured with the communication of the cellular PDUs via the WLAN. That is, the network may determine to initiate the EAP AKA procedure or the eNB assisted authentication procedure according to whether the UE is configured with the communication of the cellular PDUs via the WLAN. Thus, the network may determine to skip the EAP AKA procedure, if the UE is configured with the communication of the cellular PDUs via the WLAN.

Realization of the present invention is not limited to the above description. The following examples may be applied to the process 30.

In one example, the network may transmit a first EAP request message to the UE via the WLAN, when the network performs the EAP AKA procedure by the WLAN. The UE transmits a first EAP response message in response to the first EAP request message via the WLAN. The network may transmit a second EAP request message in response to the first EAP response message. Details of the EAP AKA procedure can be found in IEEE 802.1x and 3GPP specifications, and does not be repeated herein.

In one example, the cellular PDUs in the process 30 may include a plurality of LTE or 5G media access control (MAC) PDUs, a plurality of LTE or 5G radio link control (RLC) PDUs, a plurality of LTE or 5G packet data convergence protocol (PDCP) PDUs, or a plurality of new LTE or 5G PDUs defined for a communication (e.g., a transmission or a reception) via the WLAN. In one example, the cellular network may transmit a configuration message to the UE for configuring the communication of the cellular PDUs via the WLAN to the UE. In one example, the configuration message may include an RRCConnectionReconfiguration message when the cellular network is a LTE network. The cellular network may perform the eNB assisted authentication procedure to the UE by using the configuration message. In other words, the configuration message may be used to configure the UE to apply the eNB assisted authentication procedure. In one example, the configuration message may include an authentication configuration (e.g., a counter) used by the UE to derive a shared pairwise master key (PMK) with a key KeNB, when the UE applies the eNB assisted authentication procedure. Further, the configuration message may include a WLAN configuration including a service set identifier (SSID) of the WLAN, a basic SSID (BSSID) of the WLAN, an extended SSID (ESSID) of the WLAN, and/or a homogeneous ESSID (HESSID) of the WLAN, to identity the WLAN.

In one example, the network may determine to configure the communication of the cellular PDUs via the WLAN to the UE by the cellular network, and the network may transmit a message for initiating a configuration of the communication of the cellular PDUs via the WLAN for the UE by the cellular network in response to the determination. That is, an eNB of the cellular network may configure the communication of the LTE PDUs via the WLAN (e.g., according to the LTE and WLAN aggregation) to the UE by transmitting the message to the WLAN. In one example, the WLAN may determine not to initiate the EAP AKA procedure, when the WLAN receives the message. That is, the WLAN does not to transmit an EAP AKA request message to the UE for not initiating the EAP AKA procedure, when the WLAN receives the message. In one example, the eNB may transmit an internal indication to the WLAN instead of the message, if the eNB and an access point (AP)/WLAN termination (WT) of the WLAN are collocated (e.g., in a same device). The eNB also has the shared PMK either derived by the eNB or by the network from the authentication configuration in the configuration message and the key KeNB. The eNB transmits the shared PMK in the message (e.g., an AP addition request) or another message (e.g., the internal indication, an AP reconfiguration complete) to the WLAN. Then, the WLAN may obtain (e.g., derive) an encryption key according to the shared PMK for a data encryption and/or decryption in a four-way handshake procedure with the UE. The UE also derives the encryption key according to the shared PMK in the four-way handshake procedure. After the four-way handshake procedure, the UE and the WLAN encrypt the cellular PDUs transmitted to each other and decrypt the cellular PDUs received from each other using the encryption key.

In one example, the WLAN may initiate the EAP AKA procedure to the UE, before the cellular network configures the communication of the cellular PDUs via the WLAN (e.g., according to the LTE and WLAN aggregation). In this situation, the WLAN may not apply the shared PMK for the data encryption and/or decryption, because the UE has been authenticated by the WLAN. The WLAN acknowledges (e.g., indicates) the eNB that the UE has been authenticated via the AP addition request acknowledge message. Thus, the configuration message transmitted by the eNB does not used to configure the UE to perform the eNB assisted authentication procedure. That is, the cellular network may not perform the eNB assisted authentication procedure to the UE, when the UE has been authenticated by the WLAN. The configuration message does not include the authentication configuration.

In addition, there are several ways of using (e.g., applying) the shared PMK for the UE and the WLAN. In one example, the UE and the WALN may directly use the shared PMK for the data encryption and/or decryption. In one example, the UE and the WLAN may obtain (e.g., derive) an encryption key according to the shared PMK and at least parameter (e.g., a AP nonce (ANonce) and/or a station (STA) nonce (SNonce) in the four-way handshake procedure, a MAC address of the UE and/or a MAC address of the WLAN AP) for encryption and/or decryption of the data (e.g., MAC service data unit (SDU)) including the cellular PDUs in a 802.11 MAC PDU (MPDU).

In one example, the WLAN may initiate the EAP AKA procedure to the UE, if the message transmitted by the eNB to the WLAN indicates the WLAN to initiate the EAP AKA procedure or does not indicate the WLAN to initiate the eNB assisted authentication procedure. In one example, the WLAN may initiate the EAP AKA procedure to the UE, if the message does not include the shared PMK or indicates not to perform the eNB assisted authentication procedure. That is, the message is used for indicating the WLAN whether to initiate the EAP AKA procedure.

In one example, the message transmitted by the eNB to the WLAN may include a MAC address of the UE, and the WLAN may store the MAC address of the UE. Alternatively, in one example, the WLAN may receive another message including the MAC address from the eNB during an AP addition procedure. In one example, the cellar network may receive the MAC address in a MAC PDU or a radio resource control (RRC) message via a cellular transmission from the UE. In one example, a core network (e.g., a mobility management entity (MME)) of the cellular network may receive the MAC address of the UE in a non-access stratum (NAS) message, and may transmit the MAC address of the UE to the eNB. The UE may use the MAC address for a transmission and/or a reception of a plurality of 802.11 fames. Further, the WLAN may identify the UE with the stored MAC address and may determine not to initiate the EAP AKA procedure, when the WLAN receives one of the plurality of 802.11 frames including the MAC address transmitted from the UE (e.g., in a source address field in a MAC header of the one of the plurality of 802.11 frames). In one example, the WLAN may initiate the EAP AKA procedure for another UE, when the WLAM receives a 802.11 frames including a MAC address of the mentioned another UE and the WLAN does not store the MAC address of the mentioned another UE. That is, the WLAN may or may not initiate the EAP AKA procedure according to whether the WLAN stores the MAC address of the UE transmitted by the eNB, when the WLAN receives a 802.11 frame including the MAC address of the UE transmitted from the UE.

Figure 4:
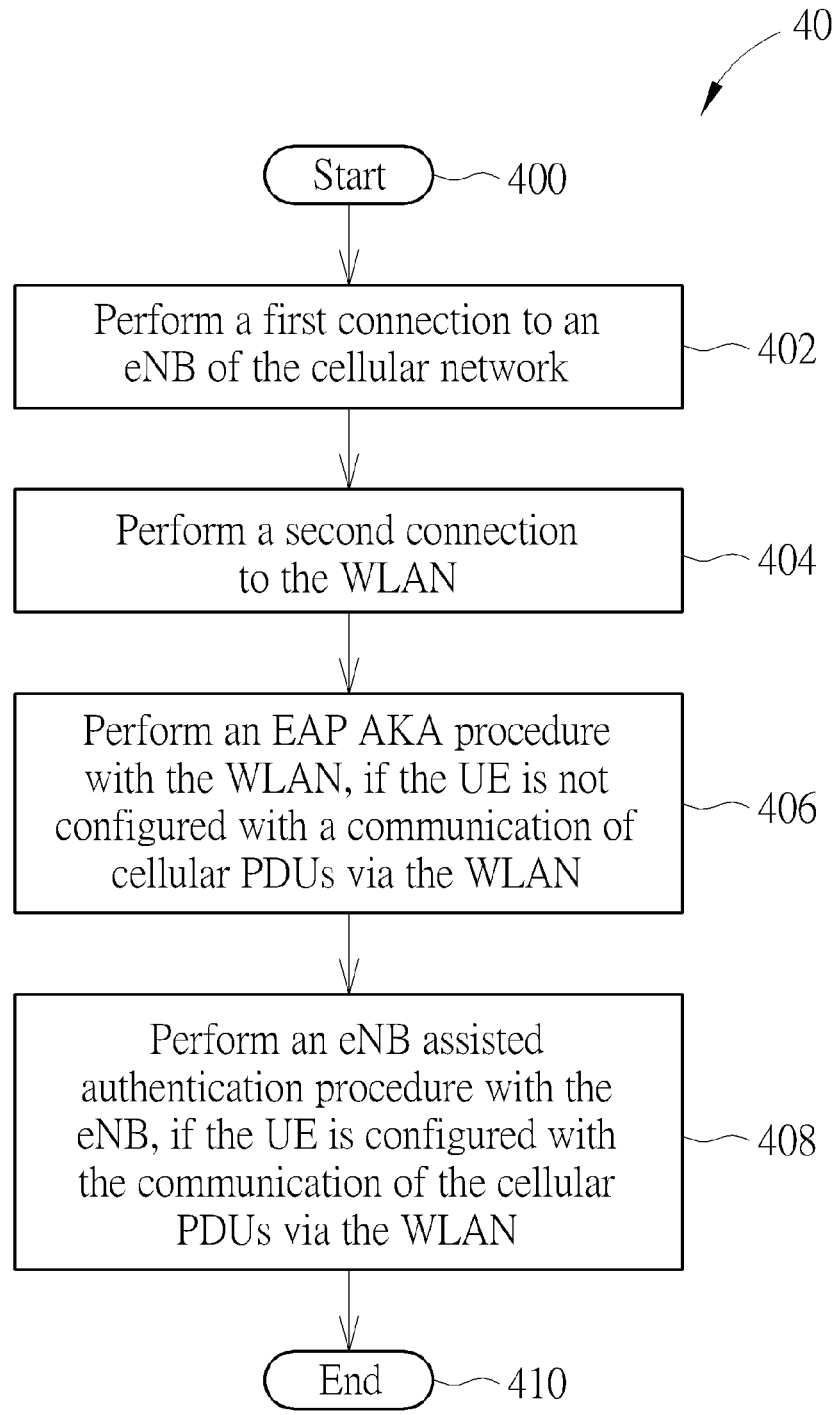
FIG. 4 is a flowchart of a process according to an example of the present invention.

FIG. 4 is a flowchart of process 40 according to an example of the present invention. The process 40 may be utilized in a UE of FIG. 1, to handle an authentication procedure with a network including a cellular network (e.g., the cellular network 100 of FIG. 1) and a WLAN (e.g., the WLAN 102 of FIG. 1). The process 40 may be compiled into the program code 214 and includes the following steps:

Step 400: Start.

Step 402: Perform a first connection to an eNB of the cellular network.

Step 404: Perform a second connection to the WLAN.

Step 406: Perform an EAP AKA procedure with the WLAN, if the UE is not configured with a communication of cellular PDUs via the WLAN.

Step 408: Perform an eNB assisted authentication procedure with the eNB, if the UE is configured with the communication of the cellular PDUs via the WLAN.

Step 410: End.

According to the process 40, the UE may perform a first connection to an eNB of the cellular network. The UE may perform a second connection to the WLAN. Then, the UE may perform an EAP AKA procedure with the WLAN, if the UE is not configured with a communication (e.g., a transmission and/or a reception) of cellular PDUs via the WLAN (e.g., according to the LTE and WLAN aggregation). The UE may perform an eNB assisted authentication procedure with the eNB, if the UE is configured with the communication of the cellular PDUs via the WLAN. That is, the UE may perform the EAP AKA procedure or the eNB assisted authentication procedure according to whether the UE is configured with the communication of the cellular PDUs via the WLAN. Thus, the problem of the authentication procedure in the prior art is solved.

Realization of the present invention is not limited to the above description. Examples about the cellular PDUs, the configuration message configuring the communication of the cellular PDUs via the WLAN, etc. described for the process 30 may be applied to the process 40 and not repeated here. The following examples may be applied to the process 40.

In one example, the UE may perform the EAP AKA procedure with the WLAN, if the UE is configured with the communication of the LTE PDUs via the WLAN and the configuration message does not include a configuration for the UE to perform the eNB assisted authentication procedure. In one example, Step 408 may further include that the UE may perform the eNB assisted authentication procedure with the eNB, if the UE is configured with the communication of the cellular PDUs via the WLAN and the configuration message includes the configuration for the UE to perform the eNB assisted authentication procedure. That is, the UE may perform the EAP AKA procedure or the eNB assisted authentication procedure according to whether the configuration message transmitted by the cellular network includes the configuration. As described for the process 30, the configuration may include the counter for the UE to obtain (e.g., derive) the shared PMK. The UE may obtain (e.g., derive) the shared PMK according to the counter and the key KeNB which is a key used for communication between the UE the eNB in the cellular communication. How to use the shared PMK in the UE and the WLAN are described for the process 30 and not repeated herein.

In one example, the UE may perform the EAP AKA procedure with the WLAN by transmitting a message (e.g., an EAP over LAN (EAPOL) Start message) to the WLAN to initiate the EAP AKA procedure. The network may transmit an EAP request message, when the network receives the message. In one example, the UE may perform the eNB assisted authentication procedure with the eNB by not transmitting the message (e.g., an EAPOL Start message) to the WLAN to not initiate the EAP AKA procedure. That is, the UE may perform the EAP AKA procedure or the eNB assisted authentication procedure according to whether the UE transmits the message to the WLAN.

Those skilled in the art should readily make combinations, modifications and/or alterations on the abovementioned description and examples. The abovementioned description, steps and/or processes including suggested steps can be realized by means that could be hardware, software, firmware, an electronic system, or combination thereof. An example of the means may be the communication device 20.

To sum up, the present invention provides a device and a method for handling authentication procedure. The EAP AKA procedure or the eNB assisted authentication procedure may be initiated (e.g., performed) by the network to the UE, according to whether the UE is configured with a communication of cellular PDUs via the WLAN. Thus, the problem of the authentication procedure in the prior art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a cellular network and a wireless local area network (WLAN) for handling an authentication procedure with a communication device, comprising:
   a storage device, for storing instructions of:
   performing a first connection to the communication device by the cellular network;
   performing a second connection to the communication device by the WLAN;
   initiating an extensible authentication protocol (EAP) authentication and key agreement (AKA) procedure to the communication device by the WLAN, if the communication device is not configured with a communication of cellular protocol data units (PDUs) via the WLAN; and
   initiating a base station (BS) assisted authentication procedure to the communication device by the cellular network for the communication device to generate a Pairwise Master Key (PMK), if the communication device is connected to both the cellular network and the WLAN and is configured with the communication of the cellular PDUs via the WLAN; and
   a processing circuit, coupled to the storage device, configured to execute the instructions stored in the storage device.

2. The network of claim 1, wherein the cellular PDUs comprises a plurality of long-term evolution (LTE) or fifth generation (5G) media access control (MAC) PDUs, a plurality of LTE or 5G radio link control (RLC) PDUs, a plurality of LTE or 5G packet data convergence protocol (PDCP) PDUs, or a plurality of new LTE or 5G PDUs defined for a communication via the WLAN.

3. The network of claim 1, wherein the communication device is configured with the communication of the cellular PDUs via the WLAN, if the cellular network transmits a configuration message to the communication device for configuring the communication of the cellular PDUs via the WLAN to the communication device.

4. The network of claim 1, wherein the storage device further stores instructions of:
   determining to configure the communication of the cellular PDUs via the WLAN to the communication device by the cellular network; and
   transmitting a message for initiating a configuration of the communication of the cellular PDUs via the WLAN for the communication device by the cellular network in response to the determination.

5. The network of claim 4, wherein the WLAN initiates the EAP AKA procedure to the communication device, before the cellular network configures the communication of the cellular PDUs via the WLAN.

6. The network of claim 4, wherein the WLAN initiates the EAP AKA procedure to the communication device, if the message does not comprise a shared PMK or indicates not to perform the BS assisted authentication procedure.

7. The network of claim 4, wherein the message comprises a MAC address of the communication device; the WLAN stores the MAC address of the communication device; the cellular network receives the MAC address in a MAC PDU or a radio resource control (RRC) message from the communication device; and the communication device uses the MAC address for a transmission and/or a reception of a plurality of 802.11 frames.

8. The network of claim 7, wherein the WLAN identifies the communication device with the stored MAC address and determines not to initiates the EAP AKA procedure, when the WLAN receives one of the plurality of 802.11 frames comprising the MAC address transmitted from the communication device.

9. A communication device for handling an authentication procedure with a network comprising a cellular network and a wireless local area network (WLAN), comprising:
   a storage device, for storing instructions of:
   performing a first connection to a base station (BS) of the cellular network;
   performing a second connection to the WLAN;
   performing an extensible authentication protocol (EAP) authentication and key agreement (AKA) procedure with the WLAN, if the communication device is not configured with a communication of cellular protocol data units (PDUs) via the WLAN; and
   performing a BS assisted authentication procedure with the BS for the communication device to generate a Pairwise Master Key (PMK), if the communication device is connected to both the cellular network and the WLAN and is configured with the communication of the cellular PDUs via the WLAN; and
   a processing circuit means, coupled to the storage device, configured to execute the instructions stored in the storage device.

10. The communication device of claim 9, wherein the cellular PDUs comprises a plurality of long-term evolution (LTE) or fifth generation (5G) media access control (MAC) PDUs, a plurality of LTE or 5G radio link control (RLC) PDUs, a plurality of LTE or 5G packet data convergence protocol (PDCP) PDUs, or a plurality of new LTE or 5G PDUs defined for a communication via the WLAN.

11. The communication device of claim 9, wherein the communication device is configured with the communication of the cellular PDUs via the WLAN by the cellular network, if the communication device receives a configuration message for configuring the communication of the cellular PDUs via the WLAN from the cellular network.

12. The communication device of claim 11, wherein the configuration message comprises a WLAN configuration comprising a service set identifier (SSID) of the WLAN, a basic SSID (BSSID) of the WLAN, an extended SSID (ESSID) of the WLAN and/or a homogeneous ESSID (HESSID) of the WLAN.

13. The communication device of claim 11, wherein the instruction of performing the BS assisted authentication procedure with the BS, if the communication device is configured with the communication of the cellular PDUs via the WLAN comprises:

performing the BS assisted authentication procedure with the BS, if the communication device is configured with the communication of the cellular PDUs via the WLAN and the configuration message comprises a configuration for the communication device to perform the BS assisted authentication procedure.

14. The communication device of claim 9, wherein the instruction of performing the EAP AKA procedure with the WLAN comprises:

transmitting a message to the WLAN to initiate the EAP AKA procedure.

15. The communication device of claim 14, wherein the instruction of performing the BS assisted authentication procedure with the BS comprises:

not transmitting the message to the WLAN to not initiate the EAP AKA procedure.

\* \* \* \* \*